Oct. 11, 1927.
R. S. BURDETTE
1,645,089
SOLID VEHICLE TIRE
Filed Jan. 14, 1925
2 Sheets-Sheet 1
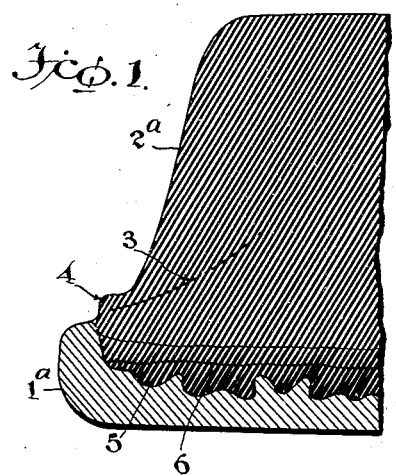
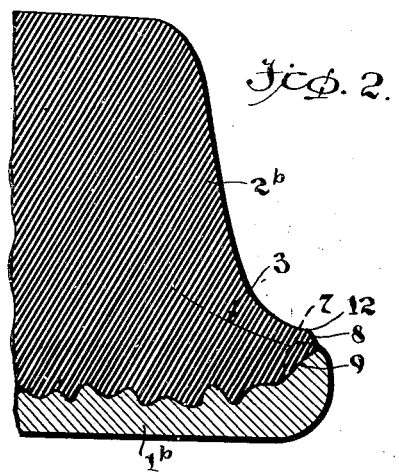
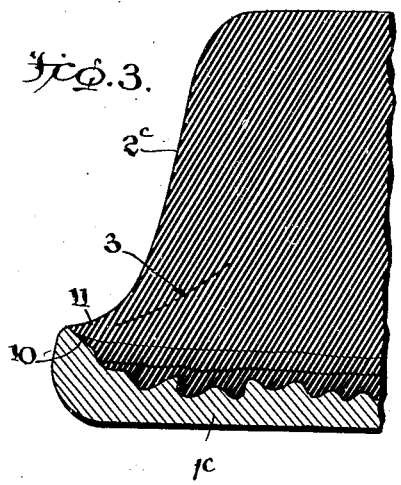
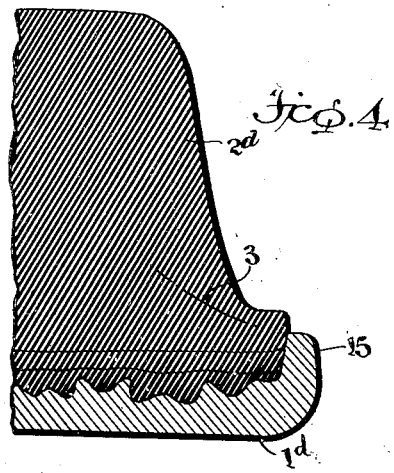
INVENTOR
R. S. Burdette,
BY
ATTORNEY Oct. 11, 1927.
R. S. BURDETTE
SOLID VEHICLE TIRE
Filed Jan. 14, 1925
1,645,089
2 Sheets-Sheet 2
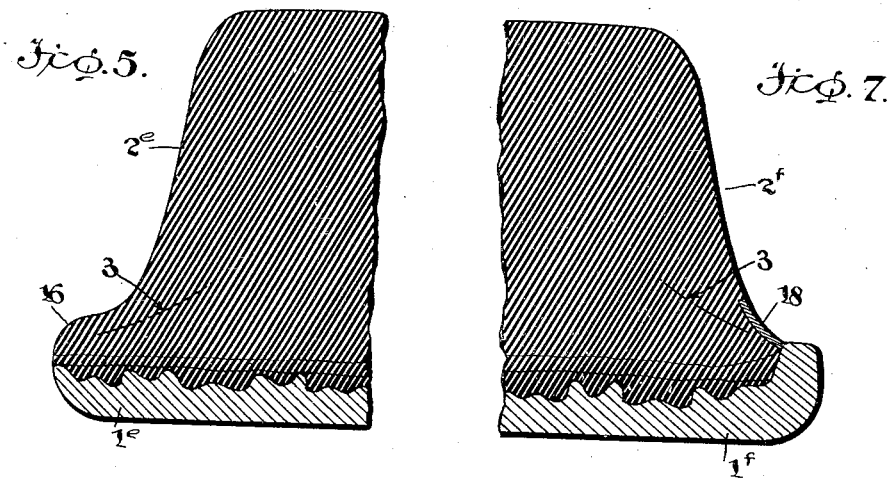
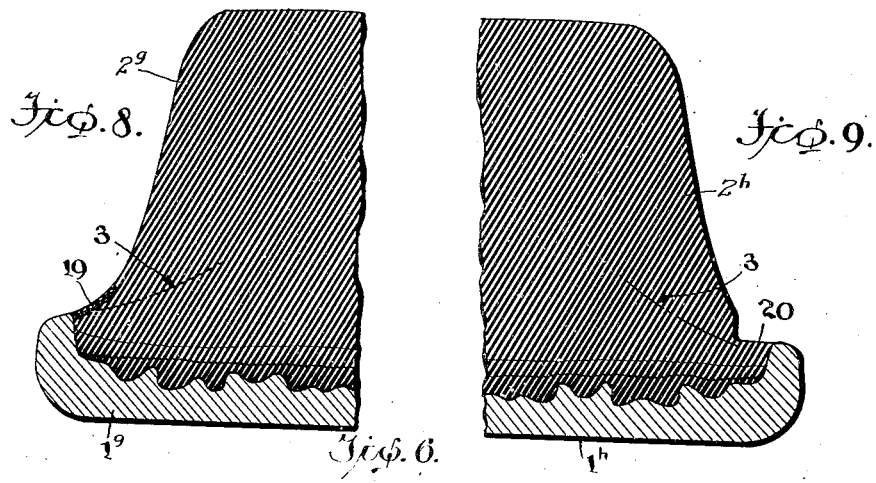
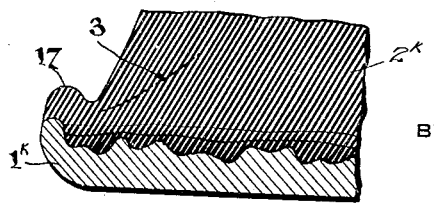
INVENTOR
R. S. Burdette,
BY
ATTORNEY Patented Oct. 11, 1927.

1,645,089

UNITED STATES PATENT OFFICE.

RICHARD S. BURDETTE, OF AKRON, OHIO, ASSIGNOR TO THE GOODYEAR TIRE & RUBBER COMPANY, OF AKRON, OHIO, A CORPORATION OF OHIO.

SOLID VEHICLE TIRE.

Application filed January 14, 1925. Serial No. 2,291.

My invention relates to rubber vehicle tires and it particularly contemplates a modification of conventional rubber vehicle tires that greatly prolongs the operating life of the tires to which it is applied.

Solid rubber vehicle tires previously have been made in a great many different forms but all of such tires, as have come within my observation, have been subject to premature failure under test and in service, when subjected to overload, because of so-called "under-cutting". By the term "undercutting" I refer to the rupture that occurs in the body of solid rubber tires, usually extending from the surface of the tire adjacent the base band into the body of the tire, in the zone of greatest shear stress intensity. Tires in ordinary commercial use that are subjected to any degree of overloading, generally fail by reason of such undercutting, which eventually extends very deeply into the body of the tire and, by reason of the continuous frictional engagement of the ruptured parts, the condition aggravates very rapidly after the rupture is once started, eventually causing premature and ultimately complete failure of the tire.

My invention resides in so forming the tire body as to provide means adapted to effectively distribute the shearing stresses developed in conventional tires along the line of the side wall that is subjected to the greatest intensity of shear when the tire is under load.

By distributing the shearing stress, and thus reducing its intensity, I delay, and in many instances prevent, the initial rupture of the side wall of the tire because of undercutting from overload and I thereby greatly prolong the life of the tire.

Failure from undercutting usually appears first as a mere line or slight wrinkle extending around the side of the tire. It then becomes a slight cut extending partially or completely around one or both sides of the tire and thereafter it rapidly deepens into the tire body until the tire is no longer fit for service. After undercutting has once started, failure of the tire therefrom quickly results. As previously stated, the rubbing of the sides of the open cut severely aggravates the destructive conditions to a point where the tire is no longer fit for service, although frequently only a small portion of the cushion body that is available for wear is worn away.

In accordance with my invention, I provide means for distributing the shear stresses over a wider zone at the surface of the tire and thereby prevent or greatly delay the start of undercutting. This is accomplished by modifying the side-wall of the tire in the zone of greatest stress intensity in various ways, all of which apparently serve to distribute the stresses to a sufficient degree to delay initial undercutting and thereby greatly prolong the life of the tire. In certain forms of my invention I employ a fillet or bead of unconfined rubber that is positioned directly over the zone of greatest shear stress intensity. This distributes the stress over a much wider zone of the surface of the tire and thereby reduces the shear intensity in sufficient amount to prevent or at least materially delay rupture of the tire body from this cause.

In other applications of my invention, I insert a fillet of rubber, or of other material having a modulus of elasticity differing from that of the tire body, in the zone of undercutting of the tire to thereby absorb and distribute the stresses over a greater area of the side of the tire than in conventional forms of tires to which the invention may be applied. In other forms of the invention, I provide grooves in the sides of the tire directly over the zone of greatest shearing stress intensity. The rounded bottom and side walls of such groove appear to distribute the shear stresses over a greater area and to thereby prevent the premature rupture of the tire body.

Each of the figures of the accompanying drawings shows a transverse sectional view of a portion of a vehicle tire illustrating different forms of my invention, as applied to different tire bodies.

Referring particularly to Figure 1 of the accompanying drawings, the cushion tire there shown comprises a base band 1ª, upon which a cushion tire body 2ª is permanently vulcanized. A test of tires of conventional form indicates that the maximum shear stresses occur substantially in the direction and position of the broken line 3 in tires of this general shape. After determining the position of the line 3 of greatest stress intensity, either by test or by calculation, I so construct the mold for the tire as to provide a bead or fillet 4 of unconfined rubber on the surface of the tire directly overlying the line of the side wall where the undercutting would naturally start. I have also found in tires of the four inch class, that the bead or fillet 4 should ordinarily be positioned about one-eighth of an inch above the base band. This is found to be true where the cushion body $2^a$ is secured to the base band $1^a$ by means of layers of hard rubber 5 and 6 that are customarily used in tires for establishing a secure union between the base band and the cushion body.

I have, also, found that when the hard rubber securing layers 5 and 6 are omitted, and where the cushion body $2^b$ is secured directly to the base band $1^b$ without such intervening layers, the zone of greatest stress intensity is positioned relatively closer to the flanges or securing face of the base band $1^b$. In such tires it emerges substantially along a line 7 of the confining flange of the tire, as shown in broken line in Figure 2. By introducing a fillet 8 of unconfined rubber at this point of the tire body $2^b$, I have found that very satisfactory results are obtained. I provide an oblique flange that supports the outer edges of the base of the tire body and also that provides the fillet 8 of unconfined rubber that operates to distribute the shearing stresses over a greater zone of the surface of the tire. This may readily be accomplished by chamfering the corner 9 of the base band. This fillet 8 of unconfined rubber operates under load in substantially the same manner as the fillet 4 of the tire shown in the preceding figure.

Figure 3 shows an additional modification of my invention in which the base band $1^c$ is cut away, as indicated at 10, to provide space for a fillet 11 of unconfined rubber overlying the zone of greatest shear intensity. The difference between this form of tire and that shown in the preceding figure resides in the slight shoulder 12 of the tire of Figure 2 that is shown as extending above the base band, whereas, in Figure 3, this portion of a tire body is dispensed with and the side wall of the body portion $2^c$ is made to curve uniformly to the chamfered surface 10.

In Figure 4 is illustrated an additional slightly different form of fillet that overlies the zone of greatest stress intensity and that substantially forms a continuation of the portion of the cushion body $2^d$ adjacent the base band $1^d$, which confines a portion of the tire body between the upstanding flanges 15.

It will be noted that, in each of the preceding Figures 1 to 4, inclusive, the base band has upstanding edge portions. My invention may also include a fillet of unconfined rubber 16 that is formed along the inner edge portions of a cushion body $2^e$ that is mounted on a substantially flat base band $1^e$, as illustrated in Figure 5.

Figure 6 also shows a portion of a tire of substantially the form illustrated in Figure 5, in which the fillet of unconfined rubber substantially forms a bead 17 along the outer edge of the cushion body $2^k$ of the tire at the point of contact with the base band $1^k$.

In addition to the above methods of distributing the shear intensity by forming a fillet on the outside of the tire body, I may insert a fillet of a material having a different modulus of elasticity within the body of the tire directly over the zone of greatest shear intensity. This construction is shown in Figure 7 of the drawings, which shows a fillet 18 adjacent the base band $1^f$, that is either of harder or softer rubber compound than the remainder of the tire body $2^f$. Such fillet is inserted within the tire body $2^f$ over the normal undercut line. The material thus inserted prevents the concentration of the shear stresses along a relatively narrow zone of the surface of the tire body $2^f$ and thereby prevents undercutting.

I have also found that a strip of fabric 19 or other tough material may be inserted in the tire body $2^g$ over the zone of greatest shear intensity, as illustrated in Figure 8. Such construction will accomplish the result heretofore outlined: namely, distribute the shear stresses at the surface of the tire over a greater zone and thereby prevent premature undercutting adjacent the base band $1^g$.

In addition to the above methods of distributing the shear stresses over larger area of the surface of the tire, I may form a groove around the edge of the tire body $2^h$ along the line of normal undercutting adjacent the base band. Such construction functions to distribute the shear over a greater portion of the outer surface of the tire side wall and provides a fillet 20 of unconfined rubber between the groove and the upstanding flange of the base band $1^h$.

The several modifications of my invention serve to illustrate various applications thereof that may be used with different forms of tires and that may be applied to tires that have previously been molded in conventional form. For instance, the application of the fillet shown in Figures 1 to 6, inclusive, depends primarily upon a simple and inexpensive modification of the tire mold to provide the necessary molding groove for the fillet of unconfined rubber or upon the insertion of material overlying the line of undercut that has a different modulus of elasticity from that of the body of the tire. In fact, I have illustrated a method of distributing the shear intensity by cutting a circumferential groove in the tire side wall adjacent the base band at the point where undercutting usually starts. This distributes the shearing stresses and prolongs the life of tires that have already been molded, although it has been found to be not so effective as certain of the other suggested methods. The form of tire shown in Figure 9 should not, however, be confined to tires that have first been molded in conventional form. This particular application of my invention could also be made to tires that are originally formed with this particular configuration.

I have found in service that when tires of conventional form of about the 4″ size are subjected to overloading, failure of the tire results prematurely and that if a fillet, of any of the forms proposed in the accompanying drawings, is formed on such tires, then the life of the tire is materially prolonged beyond the period of the normal life of corresponding tires having no such fillet formed thereon.

This may be explained by the fact that the base bands are inextensible and that they prevent any flow of the rubber that is securely vulcanized thereto. When load is applied to the tread of the tire, the body of the tire is deformed and the rubber, being substantially incompressible, flows outwardly at the sides of the tire. The zone of greatest stress intensity therefore occurs between the cushion body that is squeezed laterally and the portion of the body of the tire that is prevented from flowing by its union with the base band.

It is therefore apparent that, if a bead or fillet of unconfined rubber is provided at the zone of greatest shear intensity, this bead or fillet will distribute the stresses appearing in the surface portion of the tire over such a zone as to bring the stress intensity of that zone within the limit of elasticity of the rubber, which thereby absorbs the shear without rupture and prevents or greatly delays the initial undercutting of the tire.

It has been found in service that tires, constructed in accordance with the invention shown in Figure 1, very often fail ultimately through the breaking away of the bead or the actual separation of the bead 4 from the side wall of the tire. After the bead is separated from the tire wall, by reason of the ultimate fatigue and rupture of the material of the bead from the normal surface material of the tire, destructive undercutting develops in the usual way and extends back into the tire along the line 3.

Although I have described several illustrative forms of the application of my invention to vehicle tires, I have not attempted to show every conceivable modification thereof, but have selected representative applications that are believed to show the method of applying the invention to the design of rubber tires and particularly tires of conventional form that are already built. I therefore desire that I shall not be confined to the particular form of invention appearing in the accompanying drawings, but that I may be granted protection on all such modifications of the suggested solutions as may come within the spirit and scope of the accompanying disclosure and the appended claim.

What I claim is:

A rubber vehicle tire comprising a tread portion of substantially trapezoidal cross-section vulcanized to a metallic base band disposed along the inner periphery thereof, and a protuberance of resilient material between the side-edge of the base band and the side-wall of the tread portion, so disposed as to form a perceptible interruption of the curvature of the tread portion adjacent the base band and to distribute stresses that tend to cause the separation of the tread portion and the base band when the tire is under load.

In witness whereof, I have hereunto signed my name.

RICHARD S. BURDETTE.